United States Patent
Wang et al.

(10) Patent No.: US 11,757,571 B2
(45) Date of Patent: Sep. 12, 2023

(54) CONTROLLING DATA DUPLICATION

(71) Applicant: Telefonaktiebolaget LM Ericsson (publ), Stockholm (SE)

(72) Inventors: Min Wang, Luleå (SE); Jan Christoffersson, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 157 days.

(21) Appl. No.: 17/416,602

(22) PCT Filed: Nov. 28, 2019

(86) PCT No.: PCT/EP2019/082880
§ 371 (c)(1),
(2) Date: Jun. 21, 2021

(87) PCT Pub. No.: WO2020/126390
PCT Pub. Date: Jun. 25, 2020

(65) Prior Publication Data
US 2022/0060283 A1    Feb. 24, 2022

Related U.S. Application Data

(60) Provisional application No. 62/781,733, filed on Dec. 19, 2018.

(51) Int. Cl.
*H04W 4/00*    (2018.01)
*H04L 1/08*    (2006.01)
*H04W 74/08*   (2009.01)

(52) U.S. Cl.
CPC ........... *H04L 1/08* (2013.01); *H04W 74/0816* (2013.01)

(58) Field of Classification Search
CPC ...... H04L 1/08; H04W 74/0816; H04W 76/15
USPC ........................................ 370/329, 330, 328
See application file for complete search history.

(56) References Cited

U.S. PATENT DOCUMENTS

| | | | | |
|---|---|---|---|---|
| 2018/0324641 A1* | 11/2018 | Tsai | ....................... | H04W 72/04 |
| 2018/0376457 A1* | 12/2018 | Tseng | ................ | H04W 36/0072 |
| 2019/0386779 A1* | 12/2019 | Hong | ....................... | H04L 5/001 |
| 2020/0235897 A1* | 7/2020 | Tang | ........................ | H04L 69/22 |
| 2020/0314689 A1* | 10/2020 | Tang | ..................... | H04W 80/02 |

OTHER PUBLICATIONS

International Search Report issued in application No. PCT/EP2019/082880, dated Jun. 25, 2020 (6 pages).
Huawei "Email discussion summary on control of UL PDCP duplication," 3GPP TSG-RAN#98 R2-1704834 (May 2017) (9 pages).

(Continued)

*Primary Examiner* — Chuong T Ho
(74) *Attorney, Agent, or Firm* — Christopher & Weisberg, P.A.

(57) ABSTRACT

A method performed by a communication device. The method includes the communication device receiving assistance information, wherein the assistance information comprises at least one of: i) channel sensing statistics information (e.g., LBT failure ratio) and ii) channel occupancy, CO, information related to channel occupancy of a channel. The method further includes the communication device making a decision based on the received assistance information.

20 Claims, 10 Drawing Sheets

(56) References Cited

OTHER PUBLICATIONS

3GPP TS 38.425 v15.3.0 (Sep. 2018) 3rd Generation Partnership Project; Technical Specification Group Radio Access Network; NG-RAN; NR user plane protocol (Release 15) Sep. 2018, (22 pages).
3GPP TS 36.322 v15.3.0 (Sep. 2019) 3rd Generation Partnership Project; Technical Specification Group Radio Access Network; Evolved Universal Terrestrial Radio Access (E-UTRA); Radio Link Control (RLC) protocol specification (Release 15) Sep. 2019, (47 pages).
3GPP TS 38.300 v15.3.0 (Sep. 2018) 3rd Generation Partnership Project; Technical Specification Group Radio Access Network; NR; NR and NG-RAN Overall Description; Stage 2 (Release 15) Sep. 2018, (92 pages).
3GPP TS 38.321 v15.3.0 (Sep. 2018) 3rd Generation Partnership Project; Technical Specification Group Radio Access Network; NR; Medium Access Control (MAC) protocol specification (Release 15) Sep. 2018, (76 pages).
3GPP TS 38.331 v15.3.0 (Sep. 2018) 3rd Generation Partnership Project; Technical Specification Group Radio Access Network; NR; Radio Resource Control (RRC) protocol specification (Release 15) Sep. 2018 (445 pages).

* cited by examiner

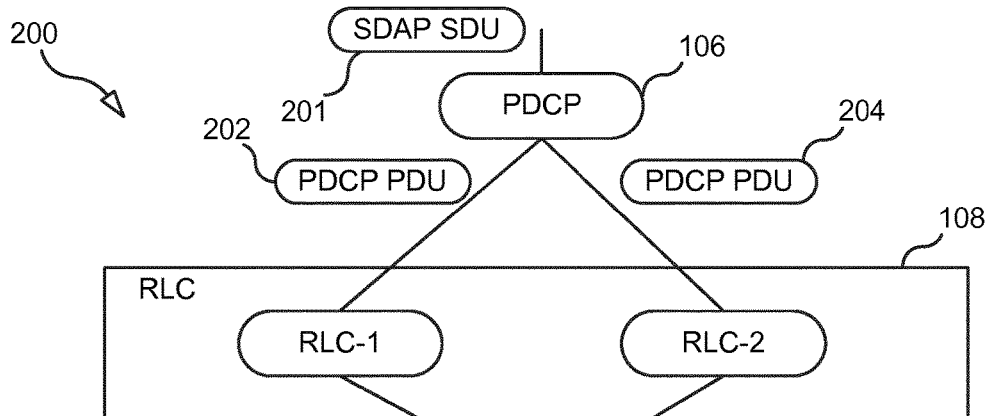
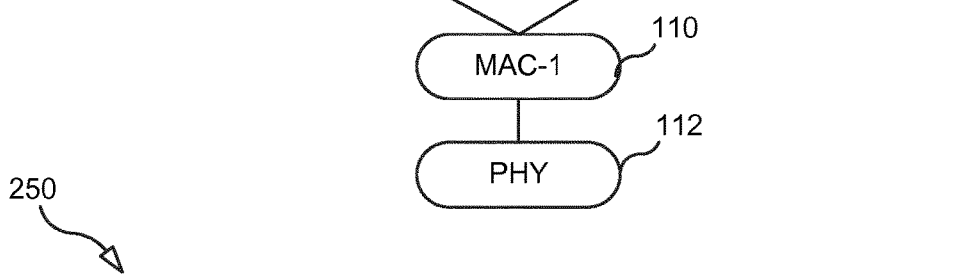
FIG. 2A
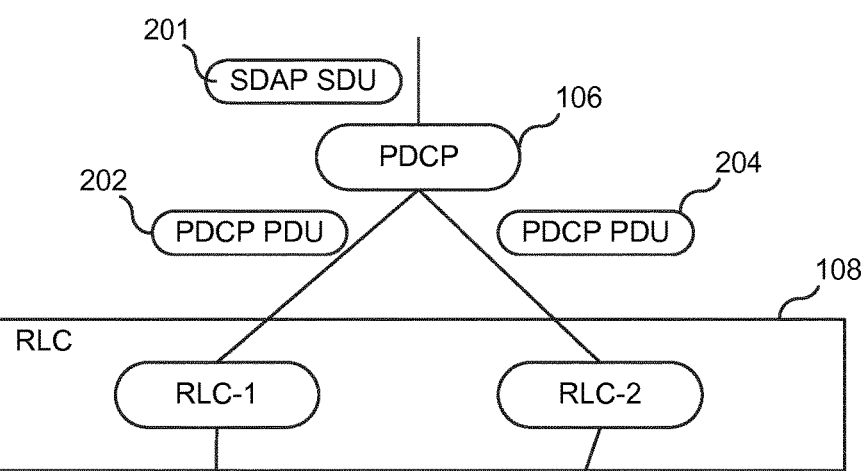
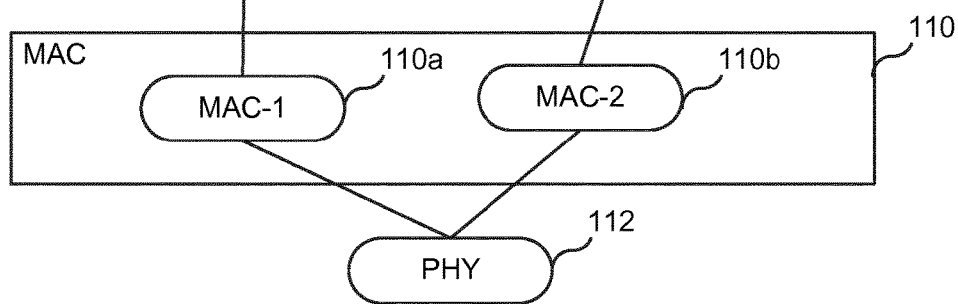
FIG. 2B

| Bits | | | | | | | | Number of Octets |
|---|---|---|---|---|---|---|---|---|
| 7 | 6 | 5 | 4 | 3 | 2 | 1 | 0 | |
| PDU Type (=2) | | | | PDCP Dupl. Ind. | Assista nce Info. Ind. | Spare | | 1 |
| Spare | | | | | | | PDCP Duplic ation Activat ion Sugge stion | 1 |
| Number of Assistance Information Fields | | | | | | | | 0 or 1 |
| Assistance Information Type | | | | | | | | 0 or (2*Number of Assistance Info Fields + sum of Number of octets for Radio Quality Assistance Information Fields) |
| Number of octets for Radio Quality Assistance Information Fields | | | | | | | | |
| Radio Quality Assistance Information | | | | | | | | |

FIG. 4

CONTROLLING DATA DUPLICATION

CROSS REFERENCE TO RELATED APPLICATIONS

This application is a 35 U.S.C. § 371 National Stage of International Patent Application No. PCT/EP2019/082880, filed Nov. 28, 2019, designating the United States and claiming priority to U.S. provisional application No. 62/781,733, filed on Dec. 19, 2018. The above identified applications are incorporated by reference.

TECHNICAL FIELD

This disclosure relates to a communication system that employs data duplication (e.g., packet duplication).

BACKGROUND

The 5G wireless communication system is expected to support a wide range of use cases with varying requirements ranging from fully mobile devices to stationary Internet-of-Things (IoT) devices or fixed wireless broadband devices. The traffic pattern associated with many use cases is expected to consist of short or long bursts of data traffic with varying length of waiting period in between (here called inactive state). In New Radio (NR), both license assisted access (LAA) and standalone unlicensed operation are to be supported in 3GPP.

RRM Measurements in NR Unlicensed Spectrum

In order to tackle with the ever increasing data demanding, NR is considered both licensed and unlicensed spectrum. The standardization work for licensed spectrum in release 15 (Rel-15) is still on-going and will be finished in 2018. Therefore, 3GPP has defined a study item on NR-based Access to Unlicensed Spectrum was approved At RAN-77. At this study item, compared to the Long Term Evolution (LTE) LAA, NR unlicensed (NR-U) also need to support dual-connectivity (DC) and standalone scenarios, where the MAC procedures including RACH and scheduling procedure on unlicensed spectrum are subject to the listen-before-talk (LBT) failures, while there was no such restriction in LTE LAA, since there was licensed spectrum in LAA scenario so the RACH and scheduling related signaling can be transmitted on the licensed spectrum instead of unlicensed spectrum.

The radio resource management (RRM) procedures in NR-U would be generally rather similar as in LAA, since NR-U is aiming to reuse LAA/eLAA/feLAA technologies as much as possible to handle the coexistence between NR-U and other legacy radio-access technologies (RATs). Channel access/selection for LAA was one of important aspects for co-existence with other RATs such as Wi-Fi. For instance, LAA has aimed to use carriers that are congested with Wi-Fi.

In licensed spectrum, a user equipment (UE) (i.e., a device capable of wireless communication with an access point (e.g., a base station or other access point) measures Reference Signal Received Power (RSRP), and Reference Signal Received Quality (RSRQ) of the downlink radio channel, and provides the measurement reports to its serving base station (e.g., 4G base station ("eNB"), or 5G base station ("gNB")). However, they don't reflect the interference strength on the carrier. Another metric Received Signal Strength Indicator (RSSI) can serve for such purpose. At the eNB/gNB side, it is possible to derive RSSI based on the received RSRP and RSRQ reports, however, this requires that they must be available. Due to the LBT failure, some reports in terms of RSRP or RSRP may be blocked (can be either due to that the reference signal transmission (DRS) is blocked in the downlink or the measurement report is blocked in the uplink). Hence, the measurements in terms of RSSI are very useful. The RSSI measurements together with the time information concerning when and how long time that UEs have made the measurements can assist the gNB/eNB to detect the hidden node. Additionally, the gNB/eNB can measure the load situation of the carrier which is useful for the network to prioritize some channels for load balance and channel access failure avoidance purposes.

LBT is designed for unlicensed spectrum co-existence with other RATs. In this mechanism, a radio device (e.g., UE, access point) applies a clear channel assessment (CCA) check before any transmission. The transmitter involves energy detection (ED) over a time period compared to a certain threshold (ED threshold) in order to determine if a channel is idle. In case the channel is determined to be occupied, the transmitter performs a random back-off within a contention window before next CCA attempt. In order to protect the ACK transmissions, the transmitter must defer a period after each busy CCA slot prior to resuming back-off. As soon as the transmitter has grasped access to a channel, the transmitter is only allowed to perform transmission up to a maximum time duration (namely, the maximum channel occupancy time (MCOT)). For QoS differentiation, a channel access priority based on the service type has been defined. For example, there are four LBT priority classes are defined for differentiation of contention window sizes (CWS) and MCOT between services.

Packet Duplication in NR Licensed

As specified in the 3GPP TS 38.300 v 15.3.1, when duplication is configured for a radio bearer by RRC, a secondary RLC entity and a secondary logical channel are added to the radio bearer to handle the duplicated Packet Data Convergence Protocol (PDCP) protocol data units (PDUs). Duplication at PDCP therefore consists in submitting the same PDCP PDUs twice: once to the primary RLC entity and a second time to the secondary RLC entity. With two independent transmission paths, packet duplication therefore increases reliability and reduces latency and is especially beneficial for Ultra-Reliable Low-Latency Communication (URLLC) services. In some scenarios, PDCP control PDUs are not duplicated and are always submitted to the primary RLC entity.

When duplication is activated, the original PDCP PDU and the corresponding duplicate shall not be transmitted on the same carrier. The two different logical channels can either belong to the same MAC entity (CA) or to different MAC entities (DC). In the former case, logical channel mapping restrictions are used in MAC to ensure that the logical channel carrying the original PDCP PDUs and logical channel carrying the corresponding duplicates are not sent on the same carrier.

When an RLC entity acknowledges the transmission of a PDCP PDU, the PDCP entity shall indicate to the other RLC entity to discard it; and when the secondary RLC entity reaches the maximum number of retransmissions for a PDCP PDU, the UE informs the gNB but does not trigger RLF.

When configuring packet duplication for a data radio bearer (DRB), RRC also sets the initial state (either activated or deactivated). After the configuration, the state can then be dynamically controlled by means of a MAC control element and in DC, the UE applies the MAC CE commands regardless of their origin (master cell group (MCG) and secondary cell group (SCG)). When duplication is deactivated for a DRB, the secondary RLC entity is not re-established, the HARQ buffers are not flushed but the corresponding logical channel mapping restrictions—if any—are lifted, and the transmitting PDCP entity should indicate to the secondary RLC entity to discard all duplicated PDCP PDUs.

When duplication is configured for an SRB the state is always active and cannot be dynamically controlled.

When activating duplication for a DRB, NG-RAN should ensure that at least one serving cell is activated for each logical channel of the DRB; and when the deactivation of SCells leaves no serving cells activated for a logical channel of the DRB, NG-RAN should ensure that duplication is also deactivated.

NR User Plane Protocol

As specified in the 3GPP TS 38.425 v 15.3.0, the NR user plane protocol is located in the User Plane of the Radio Network layer over either the Xn or the X2 or the F1 interface. The NR user plane protocol is used to convey control information related to the user data flow management of data radio bearers. Each NR user plane protocol instance is associated to one data radio bearer only.

If configured, NR user plane protocol instances exist at the Master node and the Secondary node in the context of DC or at nodes hosting F1-U protocol terminations. The NR user plane protocol supports direct communication between NR user plane protocol entities, regardless of whether they terminate the same or different user plane interfaces.

User data radio bearers may be setup for data forwarding purposes during Xn HO or during DC related mobility without requiring the execution of any additional data radio bearer related user plane protocol functions related to an NR user plane protocol instance.

On each data radio bearer, the NR user plane protocol operates with RLC AM or RLC UM.

The NR user plane protocol layer is using services of the transport network layer in order to allow flow control of user data packets transferred from the node hosting NR PDCP to the corresponding node.

The functions listed in the table below are provided by the NR user plane protocol:

information at the transfer of user data carrying a DL NR PDCP PDU from the node hosting the NR PDCP entity to the corresponding node. An NR user plane instance making use of the Transfer of Downlink User Data procedure is associated to a single data radio bearer only. The node hosting the NR PDCP entity shall assign consecutive NR-U sequence numbers to each transferred NR-U packet. The node hosting the NR PDCP entity indicates to the corresponding node whether this NR-U packet is a retransmission of NR PDCP PDU. The node hosting the NR PDCP entity can indicate to the corresponding node to either discard all NR PDCP PDUs up to and including a defined DL discard NR PDCP PDU SN or discard one or a number of blocks of downlink NR PDCP PDUs.

If the Assistance Information Report Polling Flag is equal to 1, the corresponding node shall, if supported, send the ASSISTANCE INFORMATION DATA to the node hosting the NR PDCP entity. The corresponding node shall detect whether an NR-U packet was lost and memorise the respective sequence number after it has declared the respective NR-U packet as being "lost". The corresponding node shall transfer the remaining NR PDCP PDUs towards the UE and memorise the highest NR PDCP PDU sequence number of the NR PDCP PDU that was successfully delivered in sequence towards the UE (in case RLC AM is used) and the highest NR PDCP PDU sequence number of the NR PDCP PDU that was transmitted to the lower layers.

The corresponding node shall send the DL DATA DELIVERY STATUS if the Report Polling Flag is set or when the NR PDCP PDU with the indicated sequence number has been successfully delivered, unless a situation of overload at the corresponding node is encountered.

NOTE: The Transfer of Downlink User Data procedure and the associated feedback of lost NR-U packets assist the node hosting the NR PDCP entity in avoiding NR PDCP HFN de-synchronisation. If a deployment decides to not use the Transfer of Downlink User Data procedure, NR PDCP HFN synchronization should be ensured by other means.

If the User data existence flag is set to 1, the corresponding node assumes that the node hosting the NR PDCP entity

- Provision of NR user plane specific sequence number information for user data transferred from the node hosting NR PDCP to the corresponding node for a specific data radio bearer.
- Information of successful in sequence delivery of NR PDCP PDUs to the UE from the corresponding node for user data associated with a specific data radio bearer.
- Information of NR PDCP PDUs that were not delivered to the UE or the lower layers.
- Information of NR PDCP PDUs transmitted to the lower layers for user data associated with a specific data radio bearer.
- Information of downlink NR PDCP PDUs to be discarded for user data associated with a specific data radio bearer;
- Information of the currently desired buffer size at the corresponding node for transmitting to the UE user data associated with a specific data radio bearer.
- Information of the currently desired data rate in bytes at the corresponding node for transmitting to the UE user data associated with a specific data radio bearer configured for the UE at the corresponding node;
- Information of successful in sequence delivery of NR PDCP PDUs to the UE from the corresponding node for retransmission user data associate with a specific data radio bearer;
- Information of NR PDCP PDUs transmitted to the lower layers for retransmission user data associated with a specific data radio bearer.
- Information of the specific events at the corresponding node.
- Information on Radio Link Quality from the corresponding node for user data associated with a specific data radio bearer.

The NR user plane protocol layer expects the following services from the Transport Network Layer: Transfer of user data.

Elementary procedures: Transfer of Downlink User Data

The purpose of the Transfer of Downlink User Data procedure is to provide NR-U specific sequence number has some user data for the concerned data radio bearer. The corresponding node decides whether and when to use DRX for the UE (i.e. the corresponding node may indicate the UE to use DRX even if the flag is set to 1 and the received DL USER DATA frame contains no user data).

Elementary Procedures: Downlink Data Delivery Status

The purpose of the Downlink Data Delivery Status procedure is to provide feedback from the corresponding node to the node hosting the NR PDCP entity to allow the node hosting the NR PDCP entity to control the downlink user data flow via the corresponding node for the respective data radio bearer. The corresponding node may also transfer uplink user data for the concerned data radio bearer to the node hosting the NR PDCP entity together with a DL DATA DELIVERY STATUS frame within the same GTP-U PDU.

The Downlink Data Delivery Status procedure is also used to provide feedback from the corresponding node to the node hosting the NR PDCP entity to allow the node hosting the NR PDCP entity to control the successful delivery of DL control data to the corresponding node.

When the corresponding node decides to trigger the feedback for Downlink Data Delivery procedure it shall report:

a) in case of RLC AM, the highest NR PDCP PDU sequence number successfully delivered in sequence to the UE among those NR PDCP PDUs received from the node hosting the NR PDCP entity i.e. excludes those retransmission NR PDCP PDUs;

b) the desired buffer size in bytes for the concerned data radio bearer;

c) optionally, the desired data rate in bytes associated with a specific data radio bearer configured for the UE;

d) the NR-U packets that were declared as being "lost" by the corresponding node and have not yet been reported to the node hosting the NR PDCP entity within the DL DATA DELIVERY STATUS frame;

e) if retransmission NR PDCP PDUs have been delivered, the highest NR PDCP PDU sequence number successfully delivered in sequence to the UE among those retransmission NR PDCP PDUs received from the node hosting the NR PDCP entity;

f) if retransmission NR PDCP PDUs have been transmitted, the highest NR PDCP PDU sequence number transmitted to the lower layers among those retransmission NR PDCP PDUs received from the node hosting the NR PDCP entity;

g) the highest NR PDCP PDU sequence number transmitted to the lower layers among those NR PDCP PDUs received from the node hosting the NR PDCP entity i.e. excludes those retransmission NR PDCP PDUs.

NOTE: If a deployment has decided not to use the Transfer of Downlink User Data procedure, d), e) and f) above are not applicable.

As soon as the corresponding node detects the successful RACH access by the UE for the corresponding data radio bearer(s), the corresponding node shall send initial DL DATA DELIVERY STATUS frame to the node(s) hosting the NR PDCP entity(ies). The node hosting NR PDCP entity may start sending DL data before receiving the initial DL DATA DELIVERY STATUS frame. In case the DL DATA DELIVERY STATUS frame is sent before any NR PDCP PDU is transferred to lower layers, the information on the highest NR PDCP PDU sequence number successfully delivered in sequence to the UE and the highest NR PDCP PDU sequence number transmitted to the lower layers may not be provided.

The DL DATA DELIVERY STATUS frame shall also include a final frame indication signalling whether the frame is the last DL status report received in the course of releasing a bearer from the corresponding node. Namely, the final frame indication is signalled in cases where the corresponding node knows that the bearer will be released before the DL status report is signalled. When receiving such indication, if applicable, the node hosting the NR PDCP entity considers that no more UL or DL data is expected to be transmitted between the corresponding node and the UE.

The DL DATA DELIVERY STATUS frame may also include an indication of detected radio link outage or radio link resume for the concerned data radio bearer. When receiving an indication of radio link outage detection, the node hosting the NR PDCP entity considers that traffic delivery over the data radio bearer configured for the UE is unavailable at the corresponding node both in UL and DL. When receiving an indication of radio link resume detection, the node hosting the NR PDCP entity considers that traffic delivery over the data radio bearer configured for the UE is available at the corresponding node both in UL and in DL. When receiving an indication of UL or DL radio link outage detection, the node hosting the NR PDCP entity considers that traffic delivery over the data radio bearer configured for the UE is unavailable at the corresponding node for UL or DL, depending on the indicated outage. When receiving an indication of UL or DL radio link resume detection, the node hosting the NR PDCP entity considers that traffic delivery over the data radio bearer configured for the UE is available at the corresponding node in UL or in DL, depending on the indicated resume.

The node hosting the NR PDCP entity, when receiving the DL DATA DELIVERY STATUS frame:

a. regards the desired buffer size under b) and the data rate under c) above as the amount of data to be sent from the hosting node:

a1. If the value of the desired buffer size is 0, the hosting node shall stop sending any data per bearer.

a2. If the value of the desired buffer size in b) above is greater than 0, the hosting node may send up to this amount of data per bearer beyond the "Highest Delivered NR PDCP SN" for RLC AM, or the hosting node may send up to this amount of data per bearer beyond the "Highest Transmitted NR PDCP SN" for RLC UM.

a3. The value of the desired data rate in c) above is the amount of data desired to be received in a specific amount of time. The amount of time is 1 sec.

a4. The information of the buffer size in b) above and of the data rate in c) above is valid until the next DL DATA DELIVERY STATUS frame is transferred.

b. is allowed to remove the buffered NR PDCP PDUs according to the feedback of transmitted and/or successfully delivered NR PDCP PDUs;

c. decides upon the actions necessary to take for NR PDCP PDUs reported other than transmitted and/or successfully delivered.

In case of RLC AM, after the highest NR PDCP PDU sequence number successfully delivered in sequence is reported to the node hosting the NR PDCP entity, the corresponding node removes the respective NR PDCP PDUs. For RLC UM, the corresponding node may remove the respective NR PDCP PDUs after transmitting to lower layers.

SUMMARY

The following agreements have been reached for the work item on NR-based Access to Unlicensed Spectrum:

Study the additional functionality needed beyond the specifications for operation in licensed spectrum in the following deployment scenarios.
- Carrier aggregation between licensed band NR (PCell) and NR-U (SCell)
  ○ NR-U SCell may have both DL and UL, or DL-only.
- Dual connectivity between licensed band LTE (PCell) and NR-U (PSCell)
- Stand-alone NR-U
- An NR cell with DL in unlicensed band and UL in licensed band
- Dual connectivity between licensed band NR (PCell) and NR-U (PSCell)

In this work item, NR-U operation needs to support both standalone and DC scenarios meaning that both RACH and PUCCH-SR signaling need to be transmitted over unlicensed spectrum cells, since a NR-U cell may operate as a primary cell. In the existing NR licensed, the PDCP duplication is applied over two connections to provide improved transmission reliability and reduced UP latency. The feature is intended for URLLC like services.

In an NR-U scenario, the UE may experience LBT failure on any of the link which is deployed at an unlicensed carrier. That would delay the transmission of the data on this link. It is beneficial to apply PDCP duplication on NR-U links (one link or two links) to overcome the LBT failures. But, in the existing NR licensed specification where the PDCP function was introduced, the criteria that is used to trigger PDCP duplication don't cover the LBT results or channel occupancy, meaning that the direct reuse of the existing PDCP function in NR-U is not able to trigger usage of PDCP duplication depending on LBT statistics. There is a gap in the existing specification. Accordingly, it is meaningful to study above issues and propose corresponding solutions to improve duplication performance to overcome LBT failures.

This disclosure, therefore, proposes to use knowledge of current channel occupancy and/or LBT performance into account when enabling or disabling data duplication. This may be done by signaling this information in the NR user plane protocol. The data duplication may also apply to MAC control elements (CEs) which are not otherwise typically duplicated.

Accordingly, in one aspect there is provided a method for data duplication. In one embodiment, the method includes receiving channel sensing statistics information (e.g., LBT failure ratio) and deciding, based on the received channel sensing statistics information, whether to initiate data duplication. In another embodiment, the method includes receiving channel occupancy, CO, information related to channel occupancy of a channel and deciding, based on the received CO information, whether to initiate data duplication. Deciding whether to initiate data duplication based on the CO information comprises deciding to initiate data duplication as a result of determining that a criteria for activating data duplication is satisfied, and determining that the criteria is satisfied comprises determining that the CO information indicates that the channel occupancy is greater than a threshold.

Enabling or disabling data duplication based on knowledge of current channel occupancy and/or LBT performance provides at least the following advantages: an improvement in transmission reliability, a reduction in latency, and better flexibility to the application of PDCP duplication function.

In another aspect there is provided a method for control data duplication. The method includes a first MAC entity obtaining control data (e.g., generating a MAC CE or obtaining physical layer data (PLD)), transmitting a first MAC PDU comprising the control data, and either i) triggering a second MAC entity to generate a duplicate of the control data or ii) providing to the second MAC entity a duplicate of the obtained control data.

In another aspect there is provided a method performed by a communication device. The method includes the communication device receiving assistance information, wherein the assistance information comprises at least one of: i) channel sensing statistics information and ii) channel occupancy, CO, information related to channel occupancy of a channel. The method further includes the communication device making a decision based on the received assistance information.

In another aspect there is provided computer program that comprises instructions which when executed by processing circuitry causes the processing circuitry to perform any of the methods described herein. In another aspect there is provided a carrier containing the computer program, where the carrier is one of an electronic signal, an optical signal, a radio signal, and a computer readable storage medium.

In another aspect there is provided a communication device that is adapted to perform any of the method described herein. In some embodiment, the communication device includes processing circuitry coupled to the first and second antenna arrangements; and a memory, said memory containing instructions executable by said processing circuitry, whereby said communication device is adapted to perform any of the methods.

BRIEF DESCRIPTION OF THE DRAWINGS

The accompanying drawings, which are incorporated herein and form part of the specification, illustrate various embodiments.

FIG. 2A illustrates packet duplication according to one embodiment.

FIG. 2B illustrates packet duplication according to another embodiment.

FIG. 4 illustrates a frame structure for transmitting assistance information.

DETAILED DESCRIPTION

Figure 1:
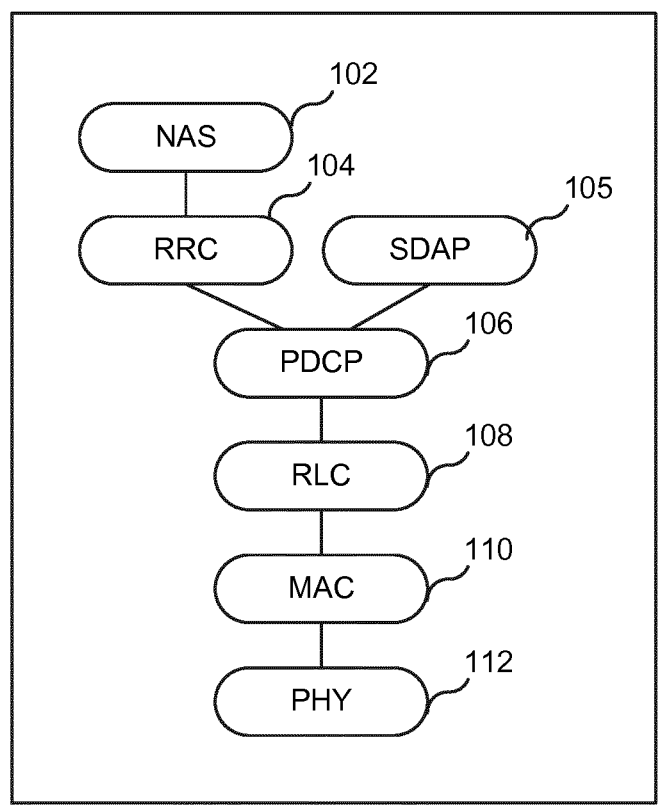
FIG. 1 illustrates an example protocol stack.

FIG. 1 illustrates an example protocol stack of a wireless communication device (e.g., UE or access point), which protocol stack includes: Non-Access Stratum (NAS) layer 102; Radio Resource Control (RRC) layer 104; Service Data Adaptation Protocol (SDAP) layer 105, Packet Data Convergence Protocol (PDCP) layer 106, Radio Link Control (RLC) layer 108; Media Access Control (MAC) layer 110; and a Physical (PHY) layer 112. In an example, PHY layer 112 provides transport services to higher layers (e.g. MAC). In an example, services and functions of a MAC layer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. In an example, RLC layer 108 may support multiple transmission modes (e.g., transparent mode (TM), unacknowledged mode (UM), etc.). The RLC configuration may be per logical channel. In an example, PDCP layer 106 for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, etc. In an example, SDAP layer 105 may comprise mapping between a QoS flow and a data radio bearer. RRC layer 104 and NAS layer 102 are control lane layers.

FIG. 2A illustrates packet duplication according to one embodiment. In the embodiment shown in FIG. 2A, PDCP layer 106 of communication device 200 receives a packet 201 from a higher layer, produces a PDCP PDU 202, and also produces a duplicate packet 204 (i.e., packet 204 is a copy of packet 202). In FIG. 2A, communication device 200 communicates using a single MAC entity 110.

FIG. 2B illustrates packet duplication according to another embodiment. In the embodiment shown in FIG. 2B, PDCP layer 106 receives a packet 201 from a higher layer, produces a PDCP PDU 202, and also produces a duplicate packet 204 (i.e., packet 204 is a copy of packet 202). In FIG. 2B, communication device 250 communicates using a multiple MAC entities (i.e., MAC entities 110a and 110b).

The below described embodiments are described in the context of NR unlicensed spectrum (NR-U), but this disclosure is not limited to NR-U scenarios. For example, the disclosure is also applicable to other unlicensed operation scenarios such as LTE LAA/eLAA/feLAA.

Figure 3:
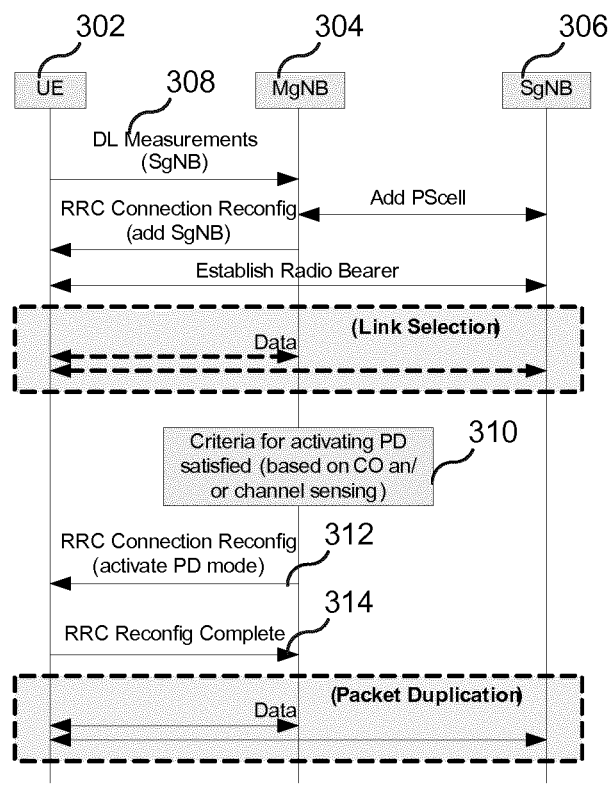
FIG. 3 is an example message flow diagram.

Referring now to FIG. 3, FIG. 3 is an example message flow diagram illustrating a message flow for activating packet duplication and involving a user equipment (UE) 302, a first transmission/reception point (TRP) 304 (which is exemplified in FIG. 3 as a gNB), and a second TRP 306 (which is exemplified in FIG. 3 as another gNB). New cells/carriers can be added for the UE 302 based on the UE's measurement reports 308. The gNB 304 (which is the serving gNB and thus denoted MgNB 304 in FIG. 3) can use link selection to determine the best cell/carrier to send the packets.

The gNB 304, in step 310, may also determine whether the criteria for activating packet duplication (PD) is satisfied. In one embodiment, gNB 304 determines whether the criteria is satisfied based on a set of information that includes: a) channel occupancy (CO) information and/or b) channel sensing statistical information.

The channel occupancy information may indicate the channel occupancy of the channel between UE 302 and gNB 304 and/or the channel occupancy of the channel between UE 302 and gNB 306. Channel occupancy is the time average of detected transmissions above a certain power level. For example, in one embodiment, channel occupancy is defined as the percentage of time when the measured RSSI sample is above a predefined threshold.

The channel sensing statistical information may indicate a percentage of occasions when UE 302, gNB 304, and/or gNB 306 has detected that a channel between UE 302 and gNB 304/306 is busy. For example, in a given period of time (e.g., 5 seconds) UE 302 may have sensed the channel between UE 302 and gNB 304 N number of time to determine whether the channel is busy, and of these N number of channel sensing occasions, the UE detected that the channel was busy M times. Hence, the channel sensing statistical information may comprise a value of M/N or a function of M/N (e.g., M/N×100). In one embodiment, the channel sensing statistical information is LBT statistics information, such as the percentage of times during a particular period that an LBT procedure has failed. For example, if UE 302 performs an LBT procedure X number of times in a given period of time and Y of these LBT procedures resulted in an LBT failure, then the channel sensing statistical information may comprise a value of Y/X (a.k.a., the LBT success to failure ratio or "LBT failure ratio" for shot) or a function of the LBT failure ratio (e.g., Y/X×100).

If the criteria for activating packet duplication (PD) is satisfied, then gNB 304 may send an RRC connection Reconfiguration message 312 to active the PD mode in UE 302. Once the UE sends the RRC Reconfiguration Complete message 314, the packet duplication mode is activated. In one embodiments, this means UE 302 can receive multiple DL assignment messages and multiple UL grants for the same packet.

As illustrated above, in a first embodiment, the decision as to whether or not data duplication should be employed may be based not only on the ordinary triggering information (e.g., radio quality indicators), but also information indicating channel occupancy and/or channel sensing statistics information (e.g., LBT statistics). The ordinary triggering information includes: CQI, HARQ Failure, HARQ Retransmissions, DL Radio Quality Index, UL Radio Quality Index, and Power Headroom Report.

By taking into account information indicating channel occupancy and/or channel sensing statistics information, the data duplication may be enabled across two links that may experience high channel occupancy or high LBT failure ratio. While the data duplication may be disabled across two links that at least one of the link has low channel occupancy or low LBT failure ratio.

In one embodiment, the NR user plane protocol is extended to include the ability to report of channel occupancy information and/or channel sensing statistics information. In one example, the ASSISTANCE INFORMATION DATA frame (PDU Type 2) that is currently defined in the TS 38.425 is enhanced to include an additional field or fields on channel occupancy or channel sensing statistics. This frame format is defined to allow the node hosting the NR PDCP entity to receive assistance information. The current frame structure, which is shown in FIG. 5.5.2.3-1 of TS 38.425, is reproduced in FIG. 4.

As shown in FIG. 4, the frame may include an Assistance Information Type field (i.e., an 8 bit value). The current version of TS 38.425 specifies the following values for the Assistance Information Type field: {0=UNKNOWN, 1=Average CQI, 2=Average HARQ Failure, 3=Average HARQ Retransmissions, 4=DL Radio Quality Index, 5=UL Radio Quality Index, 6=Power Headroom Report, 7-228=reserved for future value extensions, 229-255=reserved for test purposes}. In one embodiment, it is proposed to modify TS 38.425 such that values 7 and 8 are no longer reserved for further value extensions, but rather values 7 and 8 be used to indicated channel occupancy and channel sensing statistics (e.g., LBT failure ratio), respectively, thus leaving values 9-228 reserved for future value extensions.

Accordingly, in one embodiment the value range for the Assistance Information Type field is proposed to be defined as: {0=UNKNOWN, 1=Average CQI, 2=Average HARQ Failure, 3=Average HARQ Retransmissions, 4=DL Radio Quality Index, 5=UL Radio Quality Index, 6=Power Headroom Report, 7=Channel occupancy, 8=Channel Sensing Statistics, 9-228=reserved for future value extensions, 229-255=reserved for test purposes}. In another embodiment, there may be only one additional value added for either channel occupancy or LBT statistics. For example, value 7=Channel occupancy or Channel Sensing Statistics, leaving value 8 reserved for future value extensions.

Based on existing information (e.g. Average CQI, Average HARQ failure, etc.) together with channel occupancy and/or channel sensing statistics, a control unit (CU) (e.g., the primary gNB 304) can decide if the PDCP duplication should be enabled or disabled.

Duplication of MAC Control Elements (MAC CEs)

In one embodiment, the data duplication functionality is applicable not only to the PDCP PDUs, but also to MAC CEs (i.e., messages generated by a MAC entity). The network operator may configure a network node to select which MAC CEs should be duplicated. In one case, the network node may decide to enable the duplication for any MAC CE. In another case, the network node only configures the high priority MAC CEs to be duplicated, such as, for example: Buffer Status Reports (BSRs) and Power Headroom Report (PHRs).

Duplication of MAC CEs in a Dual-Connectivity (DC) Scenario

Figure 5A:
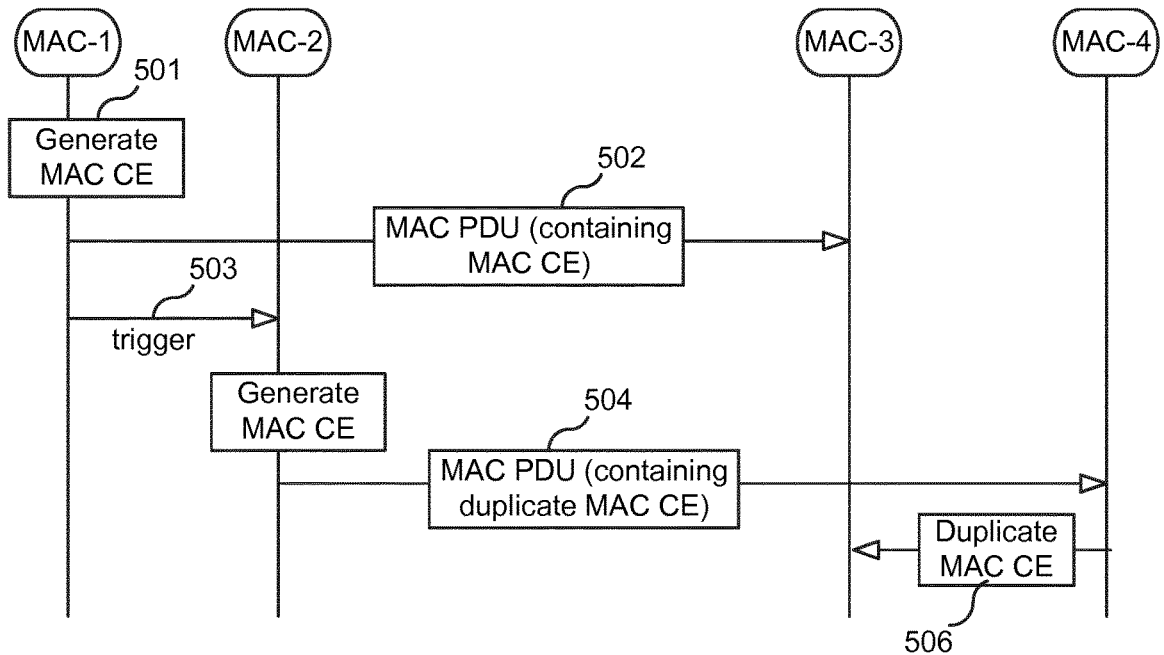
FIG. 5A is an example message flow diagram showing MAC CE duplication.
Figure 5B:
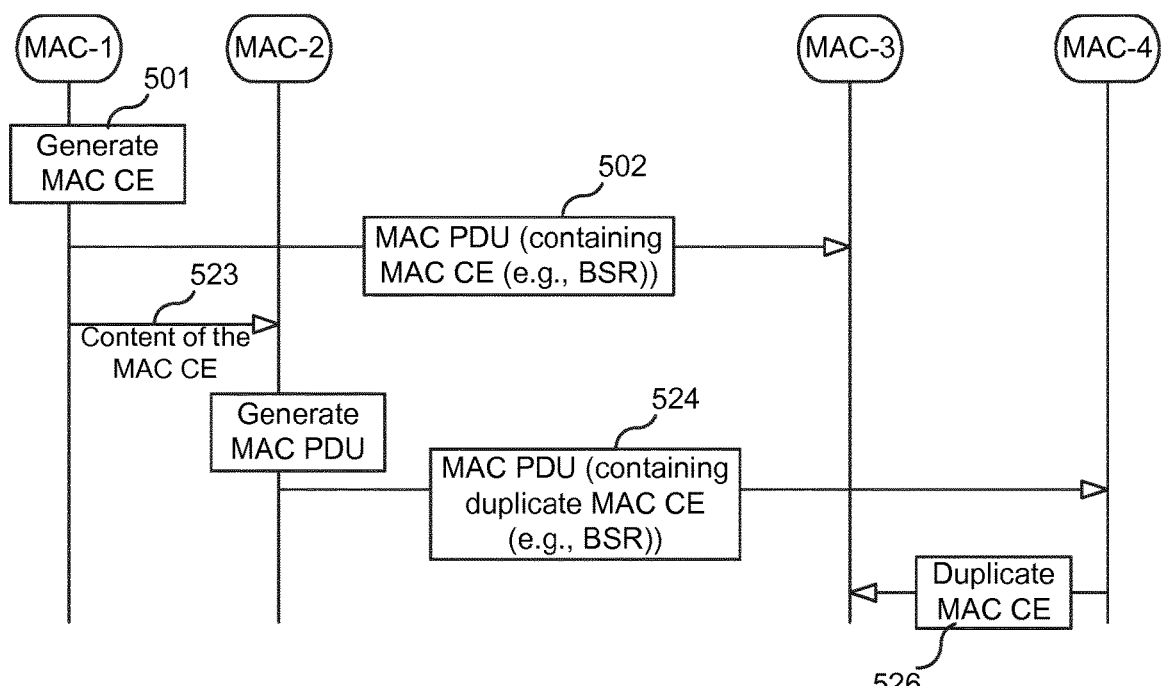
FIG. 5B is an example message flow diagram showing MAC CE duplication.

FIG. 5A and FIG. 5B illustrate MAC CE duplication in a DC scenario. In a DC scenario two or more MAC entities on the data duplicating (i.e., transmitting) side are involved in the data duplication, and on the receiving side one or more MAC entities are involved. In the examples illustrated in FIGS. 5A and 5B, four MAC entities are involved: two on the data duplicating side (MAC-1 and MAC-2) and two on the receiving side (MAC-3 and MAC-4).

As illustrated in FIG. 5A, MAC-1 has been triggered to transmit a MAC CE (e.g., BSR, PHR). That is, MAC-1 in step 501 generates a MAC CE and then transmits a MAC PDU 502 containing the MAC CE. For example, MAC PDU 502 may comprise of a set of one or more MAC subPDUs and one of these MAC subPDUs contains the MAC CE and a sub-header. As further illustrated in FIG. 5A, when MAC-1 has been triggered to generate the MAC CE, MAC-1 may trigger MAC-2 to generate and transmit a duplicate MAC CE. For example, MAC-1 may send to MAC-2 a message 503 triggering the MAC-2 to generate a MAC PDU 504 containing a MAC subPDU containing a sub-header and duplicate of the MAC CE generated by MAC-1.

FIG. 5B illustrates another MAC CE duplication option. In this embodiment, instead of MAC-1 triggering MAC-2 to generate a duplicate MAC CE (e.g., by sending to MAC-2 the trigger message 503), MAC-1 sends to MAC-2 a message 523 containing the content of the MAC CE (e.g., BSR) generated by MAC-1 so that MAC-2 can transmit a MAC PDU 524 that contains a duplicate of the MAC CE generated by MAC-1.

For duplication of a BSR, the second option shown in FIG. 5B is the preferred option due to the fact that, if MAC-2 is merely triggered to generate a BSR, it is possible that MAC-2 will generate a BSR that is not a duplicate of the BSR generated by MAC-1. This is possible because a MAC entity generates a BSR based on the MAC entity's buffer status, which buffer status may be different than the buffer status for a different MAC entity. Consequently, BSRs generated by different MAC entities may have different content. Hence, to ensure that MAC-2 transmits a BSR that is the duplicate of the BSR generated by MAC-1, MAC-1 may provide to MAC-2 the BSR generated by MAC-1. For duplication of a PHR, the first option (FIG. 5A) is preferred. The first option is preferred because a PHR MAC CE in DC has already comprise the PH information for both CGs. So, one MAC entity in a CG can obtain PH information of other CG from its own lower layer.

Referring back to FIGS. 5A and 5B, there are at least ways in which MAC-2 may transmit the duplicate MAC CE.

Figure 6:
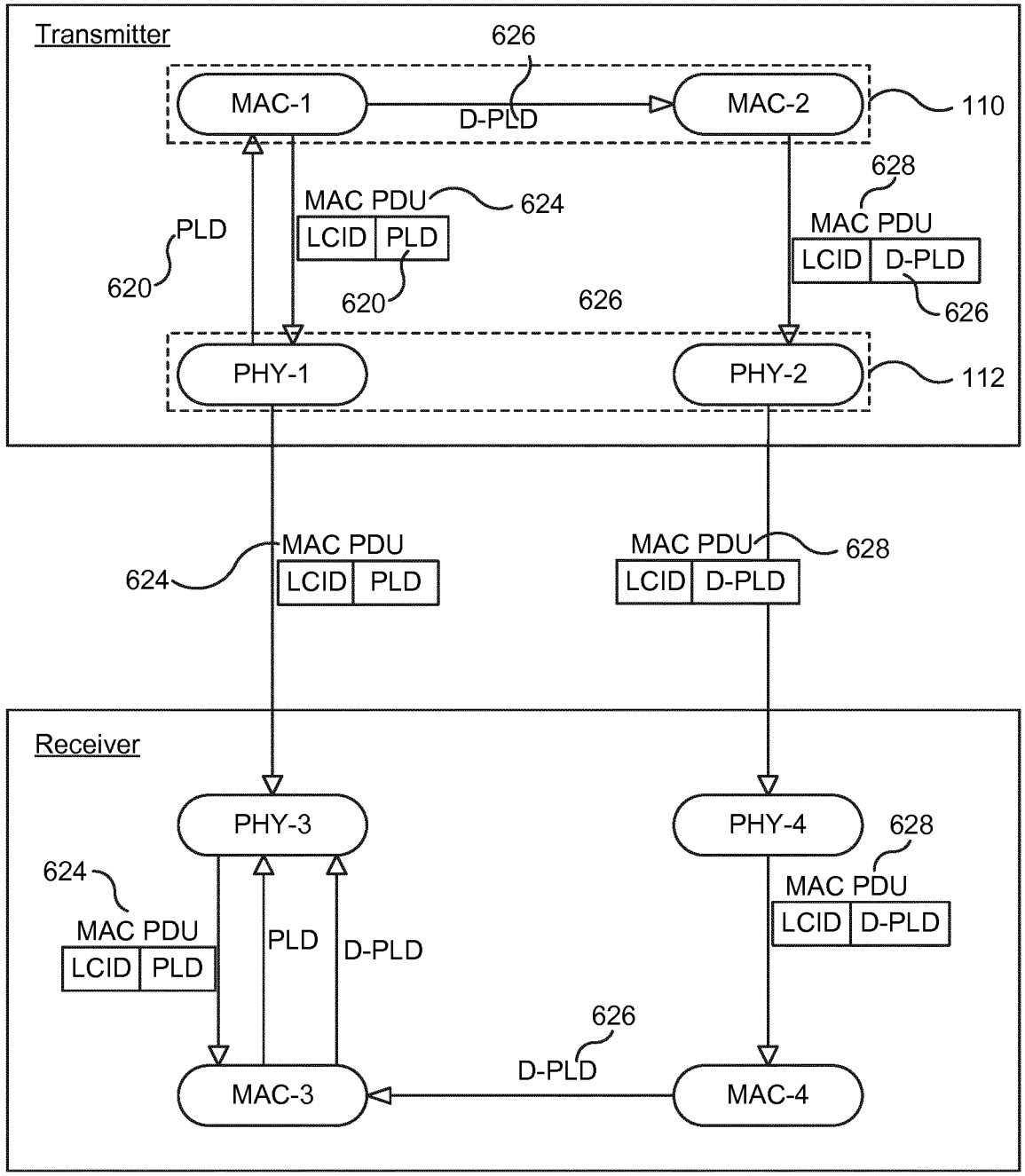
FIG. 6 illustrates duplication of physical later data (PLD).

In a first option, the duplicate MAC CE is encapsulated as a MAC SDU (as opposed to being encapsulated as a MAC CE) and is associated with a specific logical channel (LCH) identifier (ID). That is, for example, MAC-2 generates a MAC subPDU in which the payload portion of the MAC subPDU contains the duplicate MAC CE and the LCH ID field of the sub-header of the MAC subPDU contains a specific value that indicates that the payload of the MAC subPDU is a duplicate MAC CE (e.g., BSR), as opposed to a MAC SDU. Additionally, in some embodiments, because the BSR is encapsulated as a MAC SDU and not as a MAC CE, the MAC subPDU containing the duplicate BSR will be grouped with other MAC subPDUs that contain MAC SDUs, if any. For example, as explained in section 6.1.2 of 3GPP TS 38.321 v 15.3.0 ("TS 38.321"), "MAC CEs are placed together." More specifically, as explained in TS 38.321, "DL MAC subPDU(s) with MAC CE(s) is placed before any MAC subPDU with MAC SDU and MAC subPDU with padding as depicted in FIG. 6.1.2-4 [of TS 38.321]. UL MAC subPDU(s) with MAC CE(s) is placed after all the MAC subPDU(s) with MAC SDU and before the MAC subPDU with padding in the MAC PDU as depicted in FIG. 6.1.2-5 [of TS 38.321]."

In a second option, the duplicate MAC CE is a new type of MAC CE, for example named as "Embedded MAC CE," which is associated with a specific LCH ID. That is, in the second option, the duplicate MAC CE is encapsulated as a MAC CE (as opposed to being encapsulated as a MAC SDU). Thus, the MAC subPDU containing the duplicate MAC CE will be grouped with the other MAC subPDUs, if any, that contain a MAC CE, and the sub-header of the MAC subPDU containing the duplicate MAC CE will contain the specific LCH ID value.

In both options, a new LCH ID may be introduced for enabling identification of the duplicate MAC CE. Thus, The MAC entity receiving the MAC PDU containing the MAC subPDU containing the duplicate MAC CE (in this example MAC-4) is able to determine that the MAC subPDU comprises a MAC CE duplicate, as opposed to a MAC SDU or non-duplicate MAC CE, based on the LCH ID included in the sub-header of the MAC subPDU that contains the MAC CE duplicate. That is, for example, when MAC-4 receives MAC PDU 504 (or MAC PDU 524), MAC-4 can determine that the MAC PDU contains MAC subPDU that contains a duplicate MAC CE by examining the LCH ID value within the sub-header of the MAC subPDU. Upon determining that a MAC CE duplicate has been received, MAC-4 the will forward the duplicate MAC CE to the corresponding MAC entity (i.e. MAC-3 in this example). For example, as show in FIG. 5A, MAC-4 sends to MAC-3 a message 506 containing the duplicate MAC CE, and, as shown in FIG. 5B, MAC-4 sends to MAC-3 a message 526 containing the duplicate MAC CE. MAC-4 may transmit message 506/526 to MAC-3 via an X2 interface in this case where MAC-4 is implemented in one gNB and MAC-3 is implemented in another gNB.

In a DC scenario, two MAC entities are coupled together (e.g., MAC-3 and MAC-4). However, for a device configured with more than two connections, the device may be configured with more than two MAC entities for duplication purposes. In such a scenario, the device may need to maintain a table with a correspondence between each MAC entity and each new defined LCH ID. Alternatively, a cell index indicating the MAC entity can be transmitted together with the MAC CE duplicate. In that option, the mapping table is not needed.

Data Duplication in a Carrier Aggregation Scenario (CA)

In case there is only one MAC entity involved in the data duplication (such as in a CA scenario), for every MAC CE that is duplicated, the MAC entity transmits the same MAC CE over multiple links (a.k.a., legs).

PHY Data Duplication

In another embodiment, physical layer data (PLD) (e.g., uplink control information (UCI) or channel status information (CSI)) which is transmitted on PUSCH can be also duplicated over multiple links. The PLD (e.g., UCI or CSI) is generated at the PHY layer 112. In this case, there would at least two PHY layer entities (see, e.g., FIG. 6, PHY-1 and PHY-2) that are informed/signaled by higher layers to generate the UCI or CSI information and transmitted on the PUSCH together with the data. In LTE, the CSI component is one part of UCI, but here we refer to both UCI and CSI separately in case duplication for CSI or other non CSI UCI information is applied separately.

In a DC case, the MCG and SCG each has its own PUCCH channel. In a typical case, the UCI or CSI information generated in its own cell group (CG) represents the information on its own link/CG. If UCI/CSI duplication is enabled, the UCI or CSI information in one CG can be also transmitted on a PUSCH in the other CG. The UCI or CSI information may need to be exchanged between MAC entities.

In a CA case, serving cells share one common MAC entity. There may be more than one PUCCH cell groups configured to reduce the PUCCH load. In this case, the duplicated UCI or CSI may be transmitted over multiple links in the same PUCCH Cell group or across PUCCH Cell groups.

FIG. 6 illustrates some embodiments of PHY data duplication. In these embodiments, there are two PHY layer entities (PHY-1 and PHY-2) on a transmitting side (e.g., UE) and two PHY layer entities (PHY-3 and PHY-4) on a receiving side (e.g., gNB). While only two PHY layer entities are shown for each side in FIG. 6, this is for illustration purpose only and does not limit the embodiments of the present disclosure in any way. PHY-1 generates PLD (e.g., UCI or CSI) 620 (e.g., PHY-1 generates PLD 620 in response to receiving a triggering signal from one or more of higher layers on the transmitting side). As illustrated in FIG. 6, after PHY-1 generates PLD 620, PHY-1 sends PLD 620 to MAC-1.

After receiving PLD 620 from PHY-1, MAC-1 generates MAC PDU 624 (e.g., MAC-1 generates a MAC subPDU comprising a header and payload). MAC PDU 624 includes PLD 620 in its payload and the header (e.g., sub-header) includes an LCH ID. MAC-1 provides the MAC PDU 624 to PHY-1. After receiving MAC PDU 624, PHY-1 transmits MAC PDU 624 so that it is received by PHY-3. In this manner, PLD is transmitted from a PHY entity on the transmitter side to a PHY entity on the receiver side. After receiving MAC PDU 624, PHY-3 forwards MAC PDU 624 to MAC-3. Then MAC-3 retrieves PLD 620 from MAC PDU 624 and provides PLD 620 to PHY-3.

As further illustrated in FIG. 6, after receiving PLD 620 from PHY-1, MAC-1 sends to MAC-2 a duplicate of PLD 620 (i.e., duplicated PLD (D-PLD) 626. After receiving D-PLD 626, MAC-2 generates MAC PDU 628 (e.g., a MAC subPDU) including D-PLD 626 in its payload and an LCH ID in its header. In one embodiment, the LCH ID in MAC PDU 628 indicates that MAP PDU 628 contains duplicated PLD. In one embodiment, the LCH ID in MAC PDU 628 is different than the LCH ID in MAC PDU 624. In an alternative embodiment, MAC PDU 628 may use the same LCH ID as that in MAC PDU 624 for PLD 620, in addition, an index indicating MAC-1 (that the D-PLD 626 should be delivered to) can be also carried in the MAC PDU 628. MAC-2 then transmits MAC PDU 628 so that it is received by MAC-4 (i.e., MAC-2 provides MAC PDU 628 to PHY-2 for transmission and PHY-2 transmits MAC PDU 628 so that MAC PDU 629 can be received by PHY-4).

As further illustrated in FIG. 6, after receiving MAC PDU 628, PHY-4 passes the MAC PDU 628 to MAC-4, which then sends D-PLD 626 to MAC-3 (e.g., via the Xn or X2 interface) and MAC-3 may pass D-PLD 626 to PHY-3. As mentioned above, in one embodiment MAC-4 knows to send D-PLD 629 to MAC-3 because MAC PDU 628 includes a MAC entity identifier indicating MAC-3. In another embodiment, MAC-4 knows to send D-PLD 629 to MAC-3 because the LCH ID included in MAC PDU 628 indicates that MAC PDU 628 carries duplicated PLD and MAC-4 is pre-configured to send duplicated PLD to MAC-3.

In one embodiment, the duplicated packet such as MAC CE, or CSI or UCI, may be carried in a MAC PDU without carrying any data from upper layers, meaning that the MAC PDU carries only the duplicated information element.

In one embodiment, a mechanism to remove redundant duplicate data on other links is introduced. In this case, the receiving side has already received at least one copy of the data. The transmitting link may signal other links involved in the duplication that the duplicated information has been successfully received by the receiver, the other links can remove the duplicates if they are not transmitted yet. The removal may require the other links to restructure/rebuild the data PDU. For example, referring to FIG. 5A, assuming that after MAC-1 sends trigger 502 to MAC-2, MAC-1 receives an ACK from MAC-3 indicating that MAC-3 has successfully received MAC PDU 502, then MAC-1 may provide to MAC-2 an indication indicating that MAC-2 need not transmit the duplicate MAC CE. In this case, MAC-2 will not transmit MAC PDU 504 by may generate a new MAC PDU by removing from MAC PDU 504 the MAC subPDU containing the MAC CE duplicate.

In one embodiment, in a DC scenario, there are at least two options to improve the data duplication.

Option 1: a handover (e.g., PCell change or PSCell change) is triggered not only based on the measurements on the DL channel quality, but also based on the channel occupancy or channel sensing statistics (which is measured either by UE or gNB, or both). For example, it may be undesirable to handover a UE to a target cell with high channel occupancy even if the target cell has an excellent channel quality.

Option 2: more than two cells/connections are prepared for the duplications. In one example, there are multiple cells/connections configured for duplication purpose, however, at any time, there are only a limited number of cells active. In this way, the network may dynamically configure which cells are enabled in the data duplication, the other cells in the same set may be inactive. In this option, the dual connectivity may be extended to support M connections (M>2), however, at most N (e.g., N equals to 2) connections are active. With more connections involved for duplication purpose, the transmission reliability is improved since the UE/gNB is always able to find a connection with low channel occupancy for transmission.

In another embodiment, there may be more than one connection which belongs to the same cell. For instance, a UE may support more than one active band-width part (BWP) in a cell, and in this case the UE can be configured to support one separate connection for duplication in each configured BWP.

In another embodiment, in a CA scenario, the gNB can configure a set of cells (e.g., M>2) for a duplication function, each cell configured for the duplication shall be configured with a separate RLC entity, the gNB dynamically configures which cells to be active for duplication depending on situation, for instance, depending on measured channel occupancy or channel sensing statistics. In this case, the number of active cells for duplication (e.g., N) may be larger than 2. However, the other cells in the cell set for duplication may be inactive.

In another embodiment, the duplication function may be configured by the network via SIB signaling, dedicated RRC signaling, MAC CE, or other signaling means such as DCI signaling. The duplication for MAC CE, CSI, UCI, MAC SDU, PDCP SDU, etc. may be configured separately. The corresponding UE capability bits may be defined respectively. That is, when a UE sends capability information (e.g., in an RRC Connection Setup Request) to the network, the capability information may indicate what types of data duplication the UE supports.

Figure 7A:
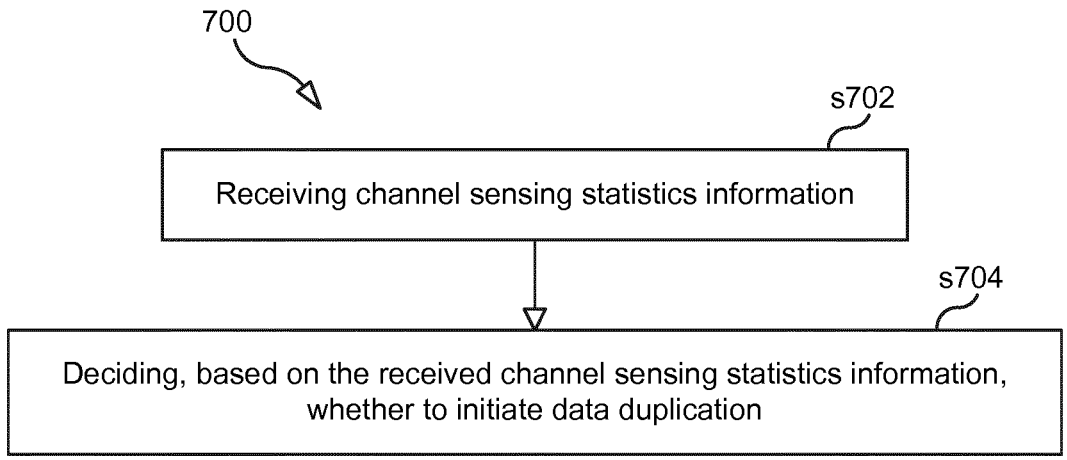
FIG. 7A is a flow chart illustrating a process according to an embodiment.

FIG. 7A is a flow chart illustrating a process 700 according to an embodiment. Process 700 may begin in step s702.

Step s702 comprises receiving channel sensing statistics information.

Step s704 comprises deciding, based on the received channel sensing statistics information, whether to initiate data duplication.

Figure 7B:
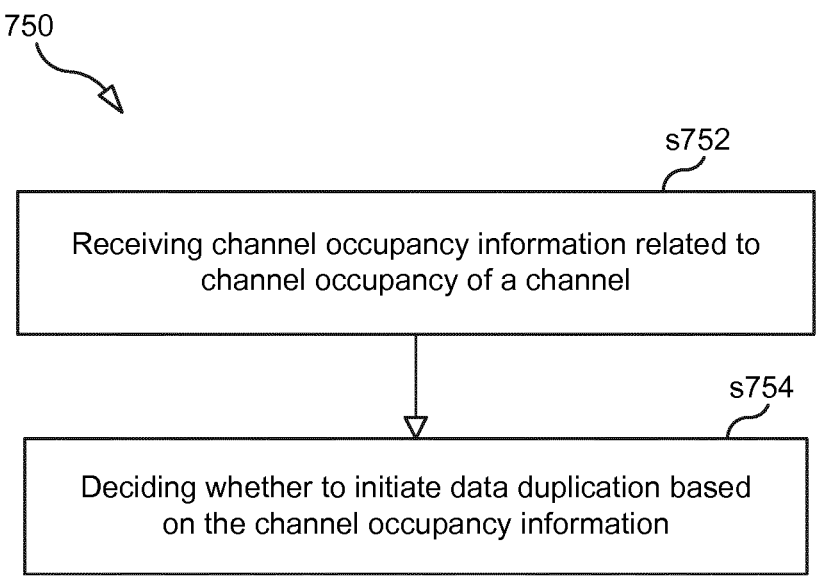
FIG. 7B is a flow chart illustrating a process according to an embodiment.

FIG. 7B is a flow chart illustrating a process 750 according to an embodiment. Process 750 may begin in step s752.

Step s752 comprises receiving channel occupancy information related to channel occupancy of a channel.

Step s754 comprises deciding, based on the received channel occupancy information, whether to initiate data duplication. Step s754 may comprise deciding to initiate data duplication as a result of determining that a criteria for activating data duplication is satisfied, wherein determining that the criteria is satisfied comprises determining that the CO information indicates that the channel occupancy is greater than a threshold.

In some embodiments, process 700 and/or 750 further comprises a first MAC entity (e.g., MAC-1) generating a MAC CE, transmitting a first MAC PDU (e.g., 502) comprising the MAC CE, and triggering a second MAC entity (e.g., MAC-2) to generate a duplicate of the MAC CE. In other embodiments, process 700 and/or 750 comprises a first MAC entity (e.g., MAC-1) generating a MAC CE, transmitting a MAC PDU (e.g., 502) comprising the MAC CE, and providing to the second MAC entity (e.g., MAC-2) a duplicate of the generated MAC CE.

Figure 8:
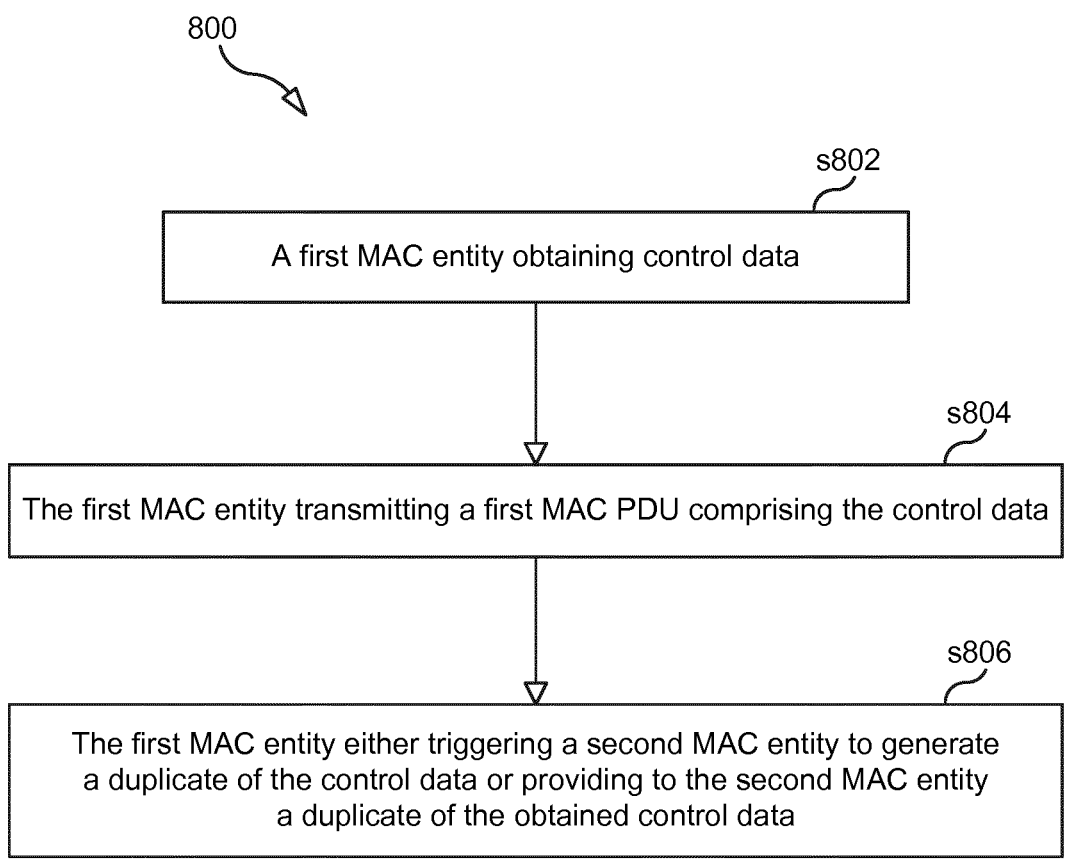
FIG. 8 is a flow chart illustrating a process according to an embodiment.

FIG. 8 is a flow chart illustrating a process 800 according to an embodiment. Process 800 may begin in step s802.

Step s802 comprises a first MAC entity (e.g., MAC-1) obtaining control data (e.g., generating a MAC CE or obtaining physical layer data (PLD) (620)).

Step s804 comprises the first MAC entity (e.g., MAC-1) transmitting a first MAC PDU (e.g., 502, 624) comprising the control data (e.g., MAC CE or PLD (620)).

Step s806 comprises the first MAC entity (e.g., MAC-1) either triggering a second MAC entity (e.g., MAC-2) to generate a duplicate of the control data (e.g., MAC CE) or providing to the second MAC entity (e.g., MAC-2) a duplicate of the obtained control data (e.g., D-PLD 626).

In some embodiments, process 700, 750, and/or 800 further comprises the second MAC entity (e.g., MAC-2) transmitting a second MAC PDU (e.g., 504, 524, 628) comprising the duplicate control data (e.g., the duplicate MAC CE or the D-PLD). The second MAC PDU (e.g., 504, 524, 628) may comprise a MAC subPDU. The MAC subPDU may comprise the duplicate control data and a subheader comprising a logical channel identifier value indicating that the MAC subPDU contains duplicate control data.

In some embodiments, process 700, 750, and/or 800 further comprises a third MAC entity (e.g., MAC-3) receiving the first MAC PDU and a fourth MAC entity (e.g., MAC-4) receiving the second MAC PDU containing the duplicated control data. Processes 700, 750, and/or 800 may further comprise MAC-4, after receiving the second MAC PDU, obtaining duplicate control data from the second MAC PDU and providing to MAC-3 the duplicate control data to MAC-3. In some embodiments, the second MAC PDU comprises a MAC subPDU that comprises a MAC entity identifier identifying MAC-3 and the MAC subPDU also comprises the duplicate control data.

In some embodiments, process 700, 750, and/or 800 further comprises after triggering the second MAC entity (e.g., MAC-2) to generate the duplicate of the MAC CE or providing to the second MAC entity (e.g., MAC-2) the duplicate of the generated MAC CE, receiving an acknowledgement indicating that the first MAC PDU (e.g., 502) has been successfully received. Process 700, 750, and/or 800 may further comprise as a result of receiving the acknowledgement, the first MAC entity providing to the second MAC entity an indication indicating that the second MAC entity need not transmit the duplicate MAC CE.

In some embodiments, the received channel sensing statistics information comprises information indicating a listen-before-talk, LBT, failure ratio.

In some embodiments, receiving the channel sensing statistics information or the CO information comprises receiving a data frame comprising a set of assistance information fields, the set of assistance information fields comprising at least a first assistance information field, and the first assistance information field comprises a type value that indicates that the first assistance information field further comprises the channel sensing statistics information and/or the CO information. The data frame may have the same format as the ASSISTANCE INFORMATION DATA frame defined in 3GPP TS 38.425 v 15.3.0.

In some embodiments, in case there is only one MAC entity involved in the duplication (such as in a CA scenario), for every MAC CE that is duplicated, the MAC entity transmits the same MAC CE over multiple legs.

In some embodiments, a duplication function may be configured by the network via SIB signaling, dedicated RRC signaling, MAC CE, and/or DCI signaling. Duplication for MAC CE and duplication for PLD (e.g., CSI or UCI), or data may be configured separately.

In some embodiments, a handover (e.g., PCell change or PSCell change) is triggered not only based on the measurements on DL channel quality, but also based on the channel occupancy or channel sensing statistics (which is measured either by UE or gNB, or both).

In some embodiments more than two cells/connections are configured for data duplication. A set of three or more cells/connections may be configured for duplication, and a subset of the set of cells/connections may be enabled for data duplication. The cells that are enabled for data duplication may be dynamically configured.

In some embodiments, a UE supports more than one active band-width part (BWP) in a cell, and the UE is configured to support one separate connection for duplication in each configured BWP.

In some embodiments, physical layer data (PLD) is duplicated.

In some embodiments, process 700, 750, and/or 800 further comprises a first physical layer entity (PHY-1) generating PLD, duplicating the PLD to create duplicated PLD (D-PLD), and providing the D-PLD to a second physical layer entity (PHY-2). Process 700, 750, and/or 800 further comprises the PHY-2 transmitting the D-PLD.

In some embodiments, process 700, 750, and/or 800 further comprises a MAC entity (MAC-4) obtaining a MAC subPDU, determining, based on a LCH ID included in the MAC subPDU, that the payload of the MAC subPDU contains duplicated PLD (D-PLD), and providing the D-PLD to a corresponding MAC entity (MAC-3) or a corresponding physical layer entity (PHY-3).

Figure 9:
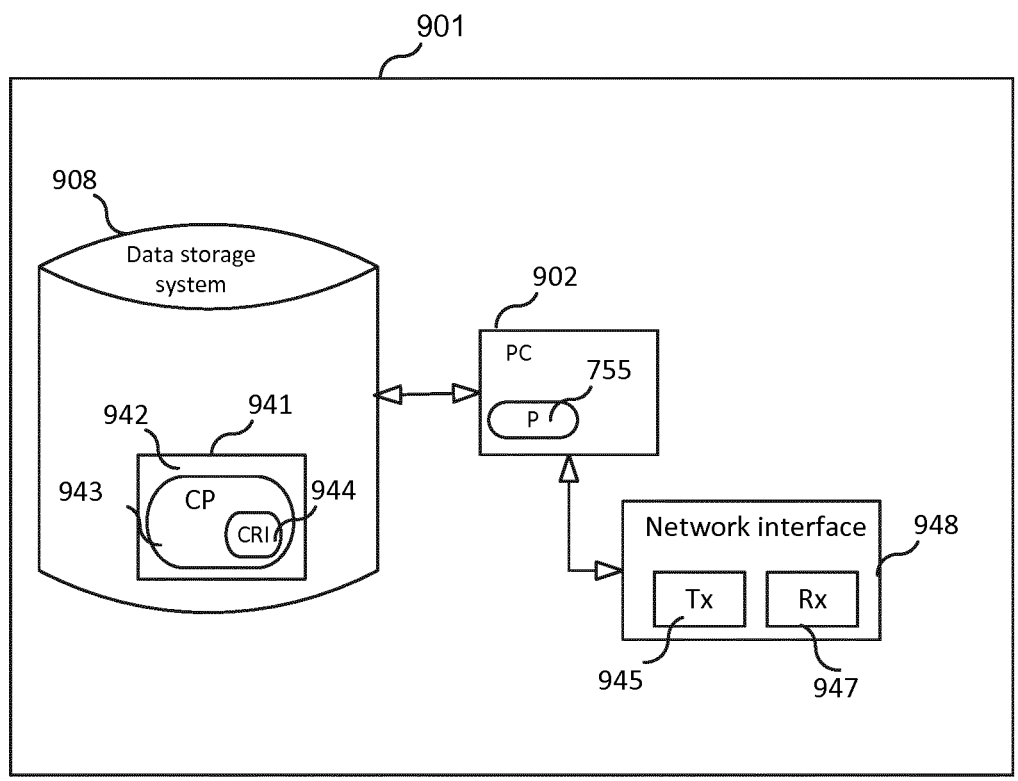
FIG. 9 is a block diagram of an apparatus according to one embodiment.

FIG. 9 is a block diagram of communication device 901, according to some embodiments, for implementing the methods described herein. As shown in FIG. 9, communication device 901 may comprise: processing circuitry (PC) 902, which may include one or more processors (P) 955 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed; a network interface 948 comprising a transmitter (Tx) 945 and a receiver (Rx) 947 for enabling communication device 901 to transmit data and receive data (e.g., wirelessly transmit/receive data); and a local storage unit (a.k.a., "data storage system") 908, which may include one or more non-volatile storage devices and/or one or more volatile storage devices. In embodiments where PC 902 includes a programmable processor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, magnetic media (e.g., a hard disk), optical media, memory devices (e.g., random access memory, flash memory), and the like. In some embodiments, the CRI 944 of computer program 943 is configured such that when executed by PC 902, the CRI causes communication device 901 to perform steps described herein (e.g., steps described herein with reference to the flow charts). In other embodiments, communication device 901 may be configured to perform steps described herein without the need for code. That is, for example, PC 902 may consist merely of one or more ASICs. Hence, the features of the embodiments described herein may be implemented in hardware and/or software.

Summary of Embodiments

Figure 10:
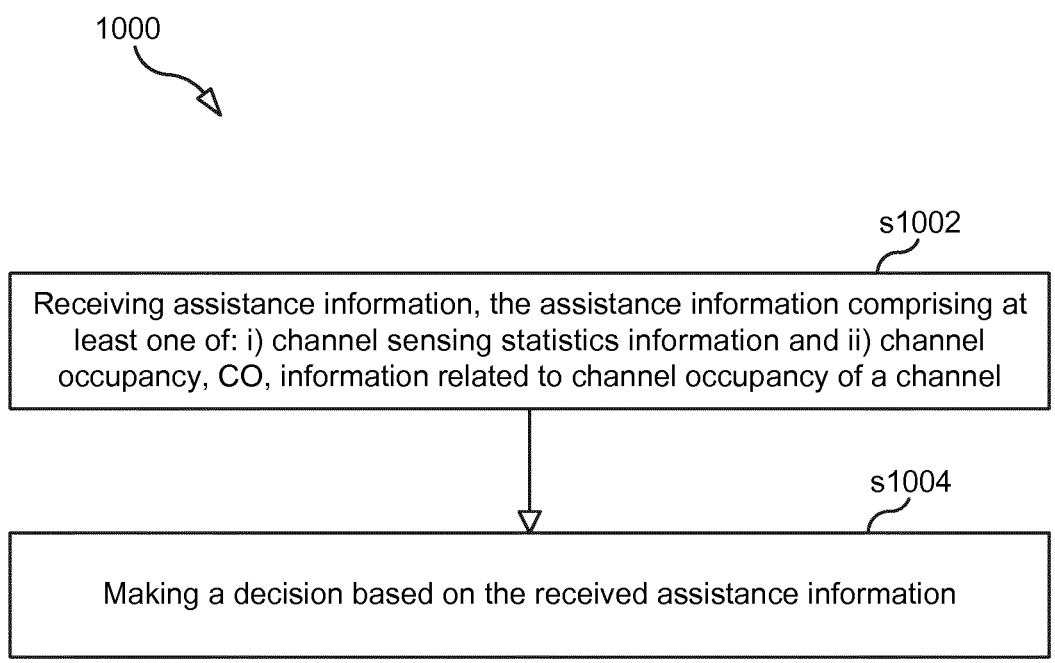
FIG. 10 is a flow chart illustrating a process according to an embodiment.

A0. A method 1000 (see FIG. 10) performed by communication device 901. Method 1000 includes a step of receiving assistance information (step s1002). The assistance information comprises at least one of: i) channel sensing statistics information (e.g., LBT failure ratio) and ii) channel occupancy, CO, information related to channel occupancy of a channel. Method 1000 further includes a step of making a decision based on the received assistance information (step s1004).

A1. A method for data duplication, the method comprising: receiving channel sensing statistics information (e.g., LBT failure ratio); and deciding, based on the received channel sensing statistics information, whether to initiate data duplication.

A2. A method for data duplication, the method comprising: receiving channel occupancy, CO, information related to channel occupancy of a channel; and deciding, based on the received CO information, whether to initiate data duplication, wherein deciding whether to initiate data duplication based on the CO information comprises deciding to initiate data duplication as a result of determining that a criteria for activating data duplication is satisfied, and determining that the criteria is satisfied comprises determining that the CO information indicates that the channel occupancy is greater than a threshold.

A3. The method of embodiment A1 or A2, further comprising: a first MAC entity (MAC-1) generating a MAC CE; the first MAC entity (MAC-1) transmitting a first MAC PDU (502) comprising the MAC CE; and the first MAC entity triggering a second MAC entity (MAC-2) to generate a duplicate of the MAC CE.

A4. The method of embodiment A1 or A2, further comprising: a first MAC entity (MAC-1) generating a MAC CE; the first MAC entity (MAC-1) transmitting a MAC PDU (502) comprising the MAC CE; and the first MAC providing to a second MAC entity (MAC-2) a duplicate of the generated MAC CE.

A5. A method for control data duplication (e.g. MAC CE duplication or physical layer data duplication), the method comprising: a first MAC entity (MAC-1) obtaining control data (e.g., generating a MAC CE or obtaining physical layer data (PLD) (620)); the first MAC entity (MAC-1) transmitting a first MAC PDU (502, 624) comprising the control data (e.g., MAC CE or PLD (620)); and the first MAC entity either: i) triggering a second MAC entity (MAC-2) to generate a duplicate of the control data (e.g., MAC CE) or ii) providing to the second MAC entity (MAC-2) a duplicate of the obtained control data.

A6. The method of embodiment A3, A4 or A5, further comprising: the second MAC entity (MAC-2) transmitting a second MAC PDU (504, 524, 628) comprising the duplicate control data (e.g., the duplicate MAC CE or the D-PLD).

A7a. The method of embodiment A6, wherein the second MAC PDU (504, 524, 628) comprises a MAC subPDU, the MAC subPDU comprises the duplicate control data, and the MAC subPDU comprises a sub-header comprising a logical channel identifier value indicating that the MAC subPDU contains duplicate control data.

A7b. The method of embodiment A6 or A7a, further comprising: a third MAC entity (MAC-3) receiving the first MAC PDU; and a fourth MAC entity (MAC-4) receiving the second MAC PDU containing the duplicated control data.

A7c. The method of embodiment A7b, further comprising MAC-4, after receiving the second MAC PDU, obtaining duplicate control data from the second MAC PDU and providing to MAC-3 the duplicate control data to MAC-3.

A7d. The method of embodiment A7c, wherein the second MAC PDU comprises a MAC subPDU that comprises a MAC entity identifier identifying MAC-3 and that also comprises the duplicate control data.

A8. The method of embodiment A3, A4 or A5, further comprising: after i) triggering the second MAC entity (MAC-2) to generate the duplicate of the MAC CE or ii) providing to the second MAC entity (MAC-2) the duplicate of the generated MAC CE, receiving an acknowledgement indicating that the first MAC PDU (502) has been successfully received; and as a result of receiving the acknowledgement, the first MAC entity providing to the second MAC entity an indication indicating that the second MAC entity need not transmit the duplicate MAC CE.

A9. The method of any one of embodiments A1 or A3-A8, wherein the received channel sensing statistics information comprises information indicating a listen-before-talk, LBT, failure ratio.

A10. The method of any one of embodiments A1-A9, wherein receiving the channel sensing statistics information or the CO information comprises receiving a data frame comprising a set of assistance information fields, the set of assistance information fields comprising at least a first assistance information field, and the first assistance information field comprises a type value that indicates that the first assistance information field further comprises the channel sensing statistics information and/or the CO information.

A11. The method of embodiment A10, wherein the data frame has the same format as the ASSISTANCE INFORMATION DATA frame defined in 3GPP TS 38.425 v 15.3.0.

A12. The method of any one of embodiments A1-A11, wherein in case there is only one MAC entity involved in the duplication (such as in a CA scenario), for every MAC CE that is duplicated, the MAC entity transmits the same MAC CE over multiple legs.

A13. The method of any one of embodiments A1-A12, wherein a duplication function may be configured by the network via SIB signaling, dedicated RRC signaling, MAC CE, and/or DCI signaling.

A14. The method of any one of embodiments A1-A13, wherein duplication for MAC CE and duplication for PLD (e.g., CSI or UCI), or data may be configured separately.

A15. The method of any one of embodiments A1-A13, wherein a handover (e.g., PCell change or PSCell change) is triggered not only based on the measurements on DL channel quality, but also based on the channel occupancy or channel sensing statistics (which is measured either by UE or gNB, or both).

A15. The method of any one of embodiments A1-A13, wherein more than two cells/connections are configured for data duplication.

A16. The method of embodiment A15, wherein a set of three or more cells/connections is configured for duplication, and a subset of the set of cells/connections is enabled for data duplication.

A17. The method of embodiment A16, wherein the cells that are enabled for data duplication are dynamically configured.

A18. The method of any one of embodiments A1-A17, wherein a UE supports more than one active band-width part (BWP) in a cell, and the UE is configured to support one separate connection for duplication in each configured BWP.

A19. The method of any one of embodiments A1-A18, wherein physical layer data (PLD) is duplicated.

A20. The method of embodiment 19, further comprising: a first physical layer entity (PHY-1) generating PLD; the PHY-1 duplicating the PLD to create duplicated PLD (D-PLD); the PHY-1 providing the D-PLD to a second physical layer entity (PHY-2); the PHY-2 transmitting the D-PLD.

A21. The method of embodiment A19, further comprising: a MAC entity (MAC-4) obtaining a MAC subPDU; the MAC-4 determining, based on a LCH ID included in the MAC subPDU, that the payload of the MAC subPDU contains duplicated PLD (D-PLD); and the MAC-4 providing the D-PLD to: a corresponding MAC entity (MAC-3) or a corresponding physical layer entity (PHY-3).

B1. An apparatus for data duplication, the apparatus being adapted to: receive channel sensing statistics information (e.g., LBT failure ratio); and decide, based on the received channel sensing statistics information, whether to initiate data duplication.

B2. An apparatus for data duplication, the apparatus being adapted to: receive channel occupancy, CO, information related to channel occupancy of a channel; and decide, based on the received CO information, whether to initiate data duplication, wherein deciding whether to initiate data duplication based on the CO information comprises deciding to initiate data duplication as a result of determining that a criteria for activating data duplication is satisfied, and determining that the criteria is satisfied comprises determining that the CO information indicates that the channel occupancy is greater than a threshold.

B3. An apparatus for data duplication, the apparatus being adapted to: obtaining control data (e.g., generating a MAC CE or obtaining physical layer data (PLD) (620)); transmit a first MAC PDU (502, 624) comprising the control data (e.g., MAC CE or PLD (620)); and trigger a MAC entity (MAC-2) to generate a duplicate of the control data or provide to the MAC entity (MAC-2) a duplicate of the obtained control data.

C1. A computer program comprising instructions for adapting an apparatus to perform the method of any one of embodiments A1-A21.

C2. A carrier containing the computer program of embodiment C1, wherein the carrier is one of an electronic signal, optical signal, radio signal, or compute readable storage medium.

While various embodiments are described herein (including the Appendix, if any), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a communication device, the method comprising:
   receiving assistance information, the assistance information including channel occupancy (CO) information related to channel occupancy of a channel;
   deciding, based on the received assistance information, whether to initiate data duplication based on the CO information;
   determining, based on the CO information indicating that the channel occupancy is greater than a threshold, that a criteria for activating data duplication is satisfied; and
   the deciding whether to initiate data duplication based on the CO information including deciding to initiate data duplication based on the determining that the criteria for activating data duplication is satisfied.

2. The method of claim 1, wherein
   receiving the assistance information comprises receiving a data frame comprising a set of assistance information fields,
   the set of assistance information fields comprising at least a first assistance information field, and
   the first assistance information field comprises a type value that indicates that the first assistance information field further comprises channel sensing statistics information and/or the CO information.

3. The method of claim 1, further comprising:
   a first MAC entity (MAC-1) generating a MAC CE;
   the first MAC entity (MAC-1) transmitting a first MAC PDU comprising the MAC CE; and
   the first MAC entity triggering a second MAC entity (MAC-2) to generate a duplicate of the MAC CE.

4. The method of claim 3, further comprising:
   after i) triggering the second MAC entity to generate the duplicate of the MAC CE or ii) providing to the second MAC entity the duplicate of the generated MAC CE, receiving an acknowledgement indicating that the first MAC PDU has been successfully received; and
   as a result of receiving the acknowledgement, the first MAC entity providing to the second MAC entity an indication indicating that the second MAC entity need not transmit the duplicate MAC CE.

5. The method of claim 1, further comprising:
   a first MAC entity (MAC-1) generating a MAC CE;
   the first MAC entity (MAC-1) transmitting a MAC PDU comprising the MAC CE; and
   the first MAC providing to a second MAC entity (MAC-2) a duplicate of the generated MAC CE.

6. The method of claim 1, wherein
   in case there is only one MAC entity involved in the duplication, for every MAC CE that is duplicated, the MAC entity transmits the same MAC CE over multiple legs.

7. The method of claim 1, wherein
   a duplication function may be configured by the network via SIB signaling, dedicated RRC signaling, MAC CE, and/or DCI signaling.

8. The method of claim 1, wherein duplication for MAC CE and duplication for physical layer data (PLD), or data may be configured separately.

9. The method of claim 1, wherein a handover is triggered not only based on the measurements on downlink (DL) channel quality, but also based on the channel occupancy or channel sensing statistics.

10. The method of claim 1, wherein
    a set of three or more cells/connections is configured for duplication, and
    a subset of the set of cells/connections is enabled for data duplication.

11. The method of claim 1, wherein a user equipment (UE) supports more than one active band-width part (BWP) in a cell, and the UE is configured to support one separate connection for duplication in each configured BWP.

12. The method of claim 1, further comprising:
    a first physical layer entity (PHY-1) generating physical layer data (PLD);
    the PHY-1 duplicating the PLD to create duplicated PLD (D-PLD);
    the PHY-1 providing the D-PLD to a second physical layer entity (PHY-2);
    the PHY-2 transmitting the D-PLD.

13. The method of claim 12, further comprising:
    a MAC entity (MAC-4) obtaining a MAC subPDU;
    the MAC-4 determining, based on a LCH ID included in the MAC subPDU, that the payload of the MAC subPDU contains duplicated PLD (D-PLD); and
    the MAC-4 providing the D-PLD to: a corresponding MAC entity (MAC-3) or a corresponding physical layer entity (PHY-3).

14. A method for control data duplication, the method comprising:
    a first MAC entity obtaining control data;
    the first MAC entity transmitting a first MAC PDU comprising the control data;
    the first MAC entity either: i) triggering a second MAC entity to generate a duplicate of the control data or ii) providing to the second MAC entity a duplicate of the obtained control data;
    the second MAC PDU including a MAC subPDU;
    the MAC subPDU including the duplicate control data; and
    the MAC subPDU including a sub-header, the sub-header including a logical channel identifier value indicating that the MAC subPDU contains duplicate control data.

15. The method of claim 14, further comprising:
    the second MAC entity transmitting a second MAC PDU comprising the duplicate control data.

16. The method of claim 15, further comprising:
    a third MAC entity (MAC-3) receiving the first MAC PDU; and
    a fourth MAC entity (MAC-4) receiving the second MAC PDU containing the duplicated control data.

17. The method of claim 16, further comprising MAC-4, after receiving the second MAC PDU, obtaining duplicate control data from the second MAC PDU and providing to MAC-3 the duplicate control data to MAC-3.

18. The method of claim 17, wherein the second MAC PDU comprises a MAC subPDU that comprises a MAC entity identifier identifying MAC-3 and that also comprises the duplicate control data.

19. A communication device, the communication device being adapted to:
    receive assistance information, the assistance information comprising channel occupancy (CO) information related to channel occupancy of a channel;

decide, based on the received assistance information, whether to initiate data duplication based on the CO information;

determine, based on the CO information indicating that the channel occupancy is greater than a threshold, that a criteria for activating data duplication is satisfied; and the decision whether to initiate data duplication based on the CO information including deciding to initiate data duplication based on the determining that the criteria for activating data duplication is satisfied.

20. A communication device, the communication device being adapted to:

obtain control data;

transmit a first MAC PDU comprising the control data; and either: i) trigger a second MAC entity to generate a duplicate of the control data or ii) provide to the second MAC entity a duplicate of the obtained control data;

the second MAC PDU including a MAC subPDU;

the MAC subPDU including the duplicate control data; and the MAC subPDU including a sub-header, the sub-header including a logical channel identifier value indicating that the MAC subPDU contains duplicate control data.

* * * * *